United States Patent [19]

Sacher

[11] Patent Number: 4,817,772
[45] Date of Patent: Apr. 4, 1989

[54] SHIFTABLE FRICTION CLUTCH

[75] Inventor: Christoph Sacher, Sauerlach/Arget, Fed. Rep. of Germany

[73] Assignee: Carl Hurth Maschinen- und Zahnradfabrik GmbH & Co., Munich, Fed. Rep. of Germany

[21] Appl. No.: 115,889

[22] Filed: Nov. 2, 1987

[30] Foreign Application Priority Data

Nov. 3, 1986 [DE] Fed. Rep. of Germany ....... 3637327

[51] Int. Cl.$^4$ .................... F16D 13/04; F16D 13/54
[52] U.S. Cl. .................................... 192/48.91; 192/54
[58] Field of Search ............ 192/48.91, 51, 54, 109 A, 192/21

[56] References Cited

U.S. PATENT DOCUMENTS

| | | | |
|---|---|---|---|
| 2,124,097 | 7/1938 | Wolfram | 192/54 X |
| 2,658,593 | 11/1953 | Doebeli | 192/48.91 X |
| 3,703,226 | 11/1972 | Strehler et al. | 192/48.91 |
| 3,931,874 | 1/1976 | Braun et al. | 192/48.91 X |
| 4,287,973 | 9/1981 | Eichinger et al. | 192/48.91 X |
| 4,576,264 | 3/1986 | Lupo et al. | 192/48.91 |

FOREIGN PATENT DOCUMENTS

| | | | |
|---|---|---|---|
| 0057057 | 5/1979 | Japan | 192/48.91 |
| 0098443 | 8/1979 | Japan | 192/54 |

Primary Examiner—Rodney H. Bonck
Attorney, Agent, or Firm—Thiel, Boutell & Tanis Flynn

[57] ABSTRACT

A shiftable friction clutch, in particular for gear drives, includes a gearshift sleeve axially movably supported on the shaft to be coupled and comprising at least one axially movable friction ring which belongs to one clutch half, which through clutch friction surfaces cooperates with the other clutch half and which is supported on the shaft to be coupled through rolling members to produce a contact pressure depending on the torque by means of sloped surfaces inclined with respect to the plane of rotation. To make shifting easier, in particular the disengagement, the sloped surfaces are provided on at least one element which is rotatable relative to the shaft and which is arranged in a corresponding recess in the shaft and can be moved against a spring force acting in direction of rotation of the shaft.

10 Claims, 4 Drawing Sheets

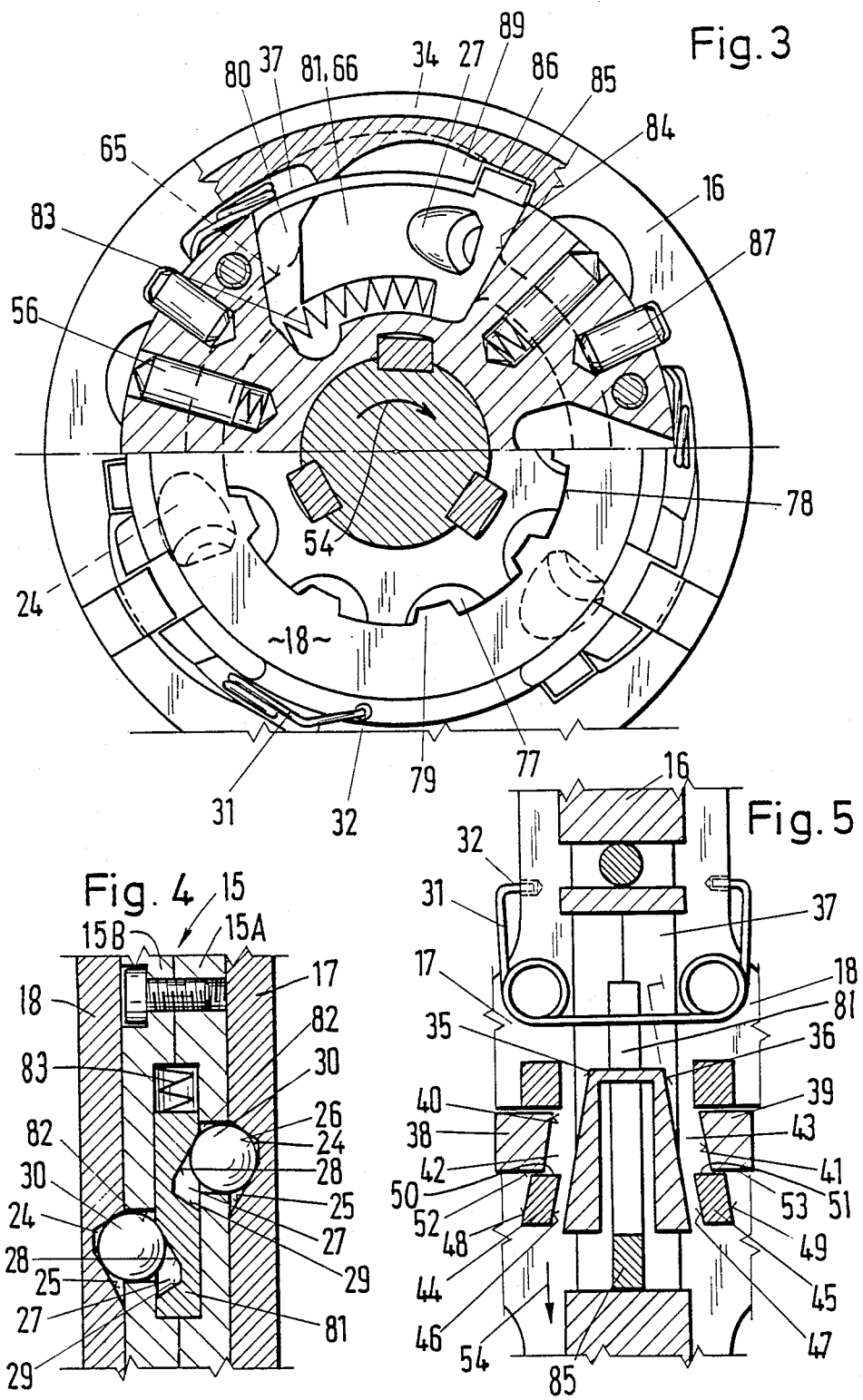

SHIFTABLE FRICTION CLUTCH

FIELD OF THE INVENTION

The invention relates to a shiftable friction clutch.

BACKGROUND OF THE INVENTION

The invention is disclosed herein starts out from a state of the art as it is known from German AS No. 20 06 984 (corresponding to U.S. Pat. No. 3 703 226). The friction clutch described therein is being used worldwide in particular in boat-reversing gears and has proven itself very well for practical use. Only the force needed for effecting disengagement will at times be identified as being still too large.

Therefore, the basic purpose of the invention is to further develop the friction clutch of the mentioned type so that the necessary disengaging force is still further reduced. The measures needed for this may by no means disadvantageously influence the engaging operation.

The purpose is attained according to the invention with a friction clutch wherein the reduction of the disengaging force is made possible by the yielding of the elements supporting the rolling members. In other words: the supporting surface for the rolling members is so to speak taken away from the rolling members during disengagement.

The segments mentioned hereinbelow are understood to be members guided in recesses on the shaft carrying the clutch, which members have approximately the shape of circular ring segments, into the side surfaces of which the sloped surfaces are provided.

In place of the one segment or the segments, it is also possible to use a closed ring which, however, with respect to its shape and thus for the manufacture, is slightly complicated. The clutch can be utilized in both directions of rotation.

BRIEF DESCRIPTION OF THE DRAWINGS

The invention will be described hereinbelow with reference to the exemplary embodiments illustrated in FIGS. 1 to 14, in which:

FIGS. 2 to 5 illustrate various cross-sectional views of the friction clutch of FIG. 1;

DETAILED DESCRIPTION

Figure 1:
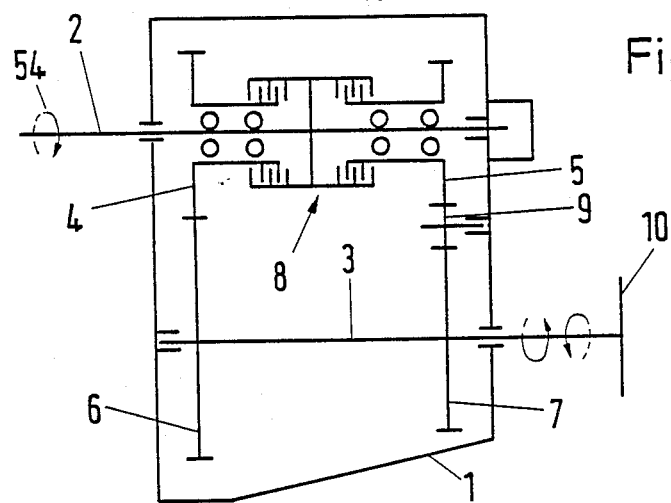
FIG. 1 is a schematic illustration of a transmission embodying the inventive friction clutch.
Figure 6:
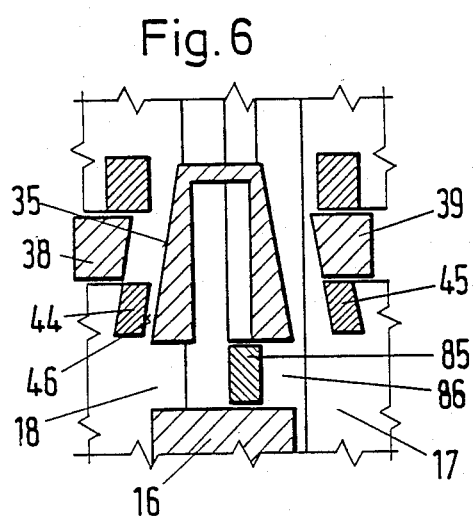
FIGS. 6 and 7 illustrate the position of the significant parts of the friction clutch during various shifting stages.

FIG. 1 illustrates a transmission, much simplified, as it can be used in particular as a boat-reversing gear. A drive shaft 2 and a drive shaft 3 having two gears 6, 7 thereon are supported in a housing 1. Two gears 4, 5 are rotatably supported on the drive shaft 2, which gears can be selectively coupled with the drive shaft by means of a friction clutch 8 which will be discussed later on. The gear 4 engages the gear 6 and the gear 5 engages an intermediate gear 9 also supported in the housing. The intermediate gear 9 also engages the gear 7. The drive shaft 2 is connected to a motor (not illustrated) at its end projecting from the housing 1. A further shaft, for example a propeller shaft (not illustrated), can be connected to the driven shaft 3 by way of a flange 10 on the end of the driven shaft 3 which projects from the housing 1.

Figure 2:
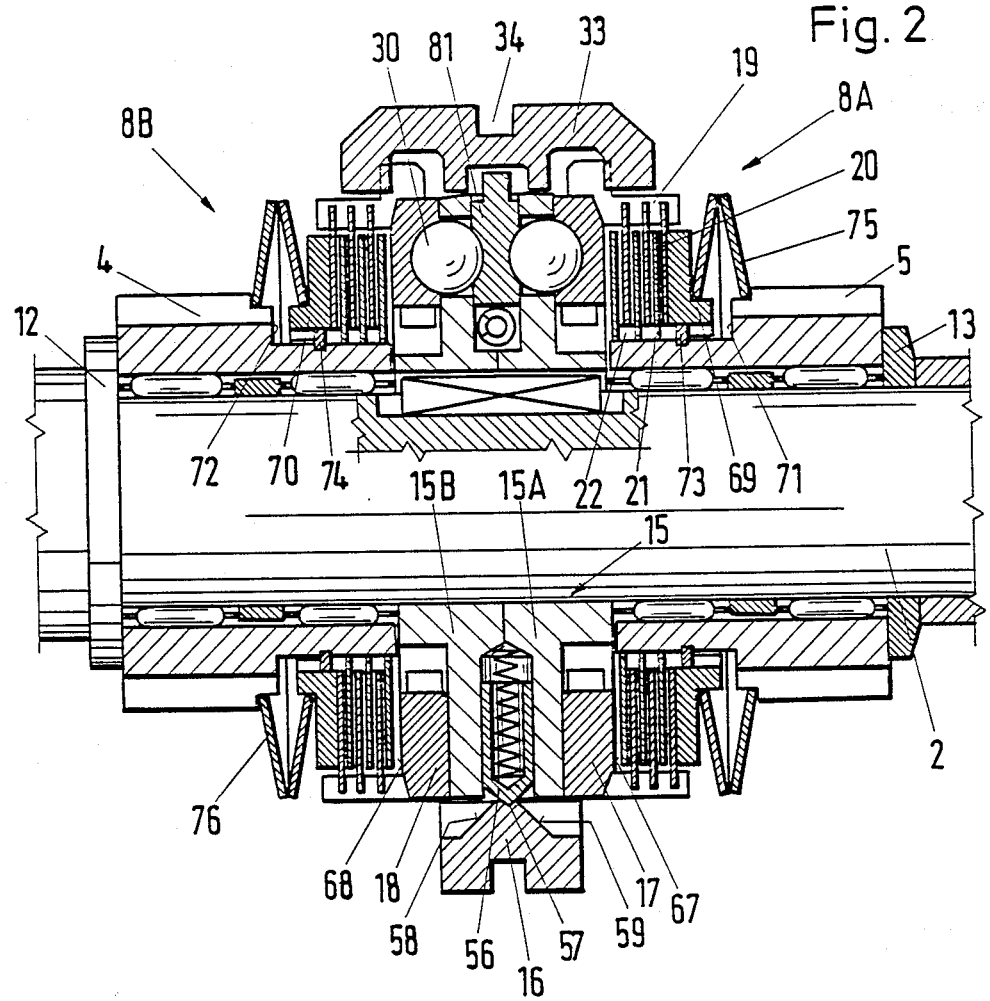

The friction clutch 8, constructed here as a double clutch, is shown in detail in FIGS. 2 to 4. The two clutches are identified by the reference numerals 8A and 8B. The gears 4,5 are held axially on the drive shaft 2 by and between a plate 13 and a shoulder 12. A collar serving as a gearshift-sleeve carrier 15 is placed and secured on the drive shaft 2 between the two gears 4,5. A gearshift sleeve 16 is guided for movement longitudinally or axially of the gearshift-sleeve carrier 15. The sleeve 16 is secured against rotation relative to the carrier 15 by pins 87 projecting into grooves or with other known means on the gearshift-sleeve carrier. A disk carrier 17,18 having a friction surface 67,68 respectively, thereon is rotatably centered on both sides of the gearshift-sleeve carrier 15. The outside diameter of the disk carriers 17,18 corresponds with the outside diameter of the gearshift-sleeve carrier 15. The disk carriers 17,18 are provided with recesses 19 (slots) into which external tooth systems of so called outer disks or clutch plates 20, are received. The outer disks 20 cooperate with socalled inner disks or clutch plates 21, which with their internal tooth system engage a corresponding external tooth system 22 on the gears 4,5. The two sets of inner and outer disks 20,21 form a disk package which is supported at its respective axial opposite ends by a pressure ring 69,70, each having a certain amount of axial play next to the inner disks 21 and the outer disks 20. The amount of play is limited on the one side by a shoulder 71,72 formed on the gears 4,5 and on the other side by a snap ring 73,74 or the like received in a groove in the drive shaft 2. The pressure rings are loaded by cup springs 75,76 to urge the inner and outer disks toward engagement. However, the snap rings are arranged such that the disks are not pressed together by the pressure rings when the disk carriers 17,18 are in the state of disengagement. Several recesses 77 are provided in the gearshift-sleeve carrier 15 in the area of a centering surface 78 for the disk carriers 17,18. The recesses extend parallel with respect to the axis of rotation of the drive shaft 2. Projections 79 on the disk carriers 17,18 extend with play into the recesses to serve as a stop for the respective disk carriers 17,18 thereby limiting in this manner the disk carriers 17,18 to a relative rotation through a limited angle.

The gearshift-sleeve carrier 15, preferably composed of two halves 15A, 15B, has plural chambers 80 therebetween, into each of which segments 81 are inserted. The segments 81 are urged in the direction of rotation 54 of the drive shaft 2 by springs 83 into engagement with a wall 84 of the chambers 80. A nose 85 projecting radially outwardly from each segment 81 extends into an axially extending groove 86 of the gearshift sleeve 16. The segments 81 each have on their opposite sides facing the disk carriers 17,18 a milled recess 27, which forms a ramplike sloped surface 28 toward the side and has a bottom surface 29. The disk carriers 17,18 are provided with milled recesses 24 corresponding with the mentioned milled recesses 27. The milled recesses 24 have also a ramplike sloped surface 25 and a bottom surface 26. A ball 30 lies in each of the milled recesses 24,27 and thus between the disk carriers 17,18 and the segments 81. Each ball 30 is guided in a corresponding bore 82 in the gearshift-sleeve carrier 15. If a disk carrier, for example 18, is rotated relative to the gearshift-sleeve carrier 15, the balls 30 can run on the sloped surfaces 25 serving as ramps and can thereby urge the disk carrier 18 away from the gearshift-sleeve carrier 15 to press the disks 20,21 together due to engagement with the friction surfaces 68. The gear 4 is thus coupled with the drive shaft 2 through the cup spring 76, the pressure ring 70, the disks 20,21, the disk carrier 18 and the gearshift-sleeve carrier 15. Since the balls 30 run onto the ramps during engagement, the disk carrier requires for its axial movement a mobility in peripheral direction. Since, on the other hand, the recesses 77 in connection with the projections 79 functioning as a stop limit the mobility, they also serve as a stop for the axial movement. The respective disk carriers 17,18 presses during engagement the disks 20,21 against the resiliently yieldable pressure rings 60,70. The maximum friction force and consequently the maximum transmittable torque thus depend on the tension of the cup springs 75, 76.

The disk carriers 17,18 are resiliently urged by hairpinlike bent return springs 31 on the gearshift-sleeve carrier 15 so that the balls 30 cannot fall out of the milled recesses 24,27. For installation reasons, they are arranged on the outside of the disk carriers 17,18. Bores shown in broken lines in FIG. 5 exist at reference numeral 32 in the disk carriers 17,18 for suspending the springs 31. Openings 37 in the gearshift sleeve 16 make possible the necessary movements of the return springs 31.

The gearshift-sleeve 16 consists of an axially extending sleeve member 33, on the outside periphery of which is provided an annular groove 34 for a not illustrated shift fork. The inner suface of the sleeve member, and on an axially facing surface portion thereof, has two sloped surfaces which converge toward the center, which surfaces are called initializing surfaces 35,36 (FIG. 5). When the sloped surfaces 25 of the disk carriers, which sloped surfaces serve as a ramp for the rolling members 30, are inclined in a certain peripheral direction, enlarging (deepening) the milled recess 24, the initial surfaces 35,36 converge together in the same direction toward the center plane (plane of rotation) of the sleeve member 33. Lugs 38,39 are also provided on the inner surface of the sleeve member and are axially spaced from the initializing surfaces 35,36, which lugs have mating surfaces 40,41 on the side facing the initializing surfaces. The mating surfaces are parallel with the initializing surfaces. The sleeve member 33 and the lugs 38,39 form inwardly open gaps 42,43. Teeth 44,45 are provided on the periphery of the disk carriers 17,18, which teeth are provided on the side facing the gearshift sleeve 16. Each tooth has a socalled initializing flank 46,47 which is parallel to the respective initializing surfaces 35,36 on the sleeve member 33. The tooth is provided with a mating flank 48,49 on the other side, which mating flank lies parallel with the respectively facing mating surface on the lug. The gaps 42,43 are wider in axial direction than the teeth 44, 45. The teeth are provided with a stop surface 50,51 approximately in a plane placed through the axis of rotation on the side facing the lug, which stop surface 50,51 is directed approximately perpendicularly with respect to the plane of rotation (direction of rotation). The lugs 38,39 are provided with a stop surface 52,53 on the side facing the teeth, which stop surface 52,53 is directed also approximately perpendicularly with respect to the plane of rotation.

A locking pin 56 loadable by a spring is guided for radial movement in the gearshift-sleeve carrier 15. In the center of the sleeve member 33 there is provided a fitting locking notch 57 for locking the gearshift sleeve 16 in the disengaged state. Two sidewardly open, thus half, locking notches or sloped surfaces 58,59 for fixing the two engaging stages are provided on the faces of the gearshift sleeve 16. The locking pin 56 and the sloped surfaces 58,59 support the engaging operation.

OPERATION

Figure 7:
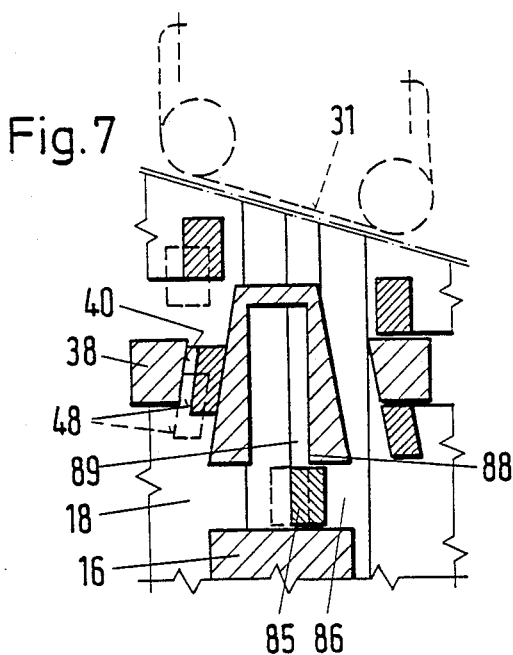

The clutch operates as follows. It is assumed that the drive shaft 2 rotates in FIGS. 1 and 2 from above downwardly over the front. This corresponds with a movement of the gearshift sleeve 16 in direction of the arrow 54. FIG. 5 illustrates the gearshift sleeve 16 and the disk carriers 17,18 in a disengaged state (neutral position). The disk carriers 17,18 are pressed by the return springs 31 against the sleeve carrier 15, the balls 30 lie in the lowermost points of the milled recesses 24 in the disk carriers 17,18. A relative movement between the gearshift sleeve 16 and the disk carriers 17,18 is prevented by the stop surfaces 50,51, 52,53 of the teeth 44,45 and the lugs 38,39. If the left clutch is supposed to be engaged, namely the gear 4 is supposed to be coupled with the drive shaft 2, then the gearshift sleeve 16 is moved to the left in the sense of FIGS. 1, 2 and 5. The blocking function of the lug 39 and tooth 45 is thereby maintained on the right side, however, the block between the lug 38 and the tooth 44 on the left side is released. The initializing surface 35 contacts directly thereafter the initializing flank 46 (FIG. 7) and moves the disk carrier 18 slightly to the right. With this a 'pre-coupling' is achieved, namely the normal clearance or play between the disks when in neutral is overcome and the inner disks 21 and the outer disks 20, which come into contact in this manner, rotate the disk carrier 17 in a direction opposite to the arrow 54 relative to the gearshift sleeve 16. This causes the balls 30 to move onto the ramps of the flat sloped surfaces 25 and to press the disks together, which completes the engagement. The springs 83 press during the entire operation the segments 81 against the walls 84 in the gearshift-sleeve carrier 15 and the noses 85 remain in the grooves 86.

Figure 14:
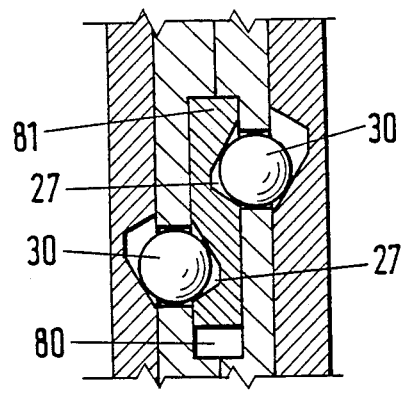
FIG. 14 illustrates the position of the support element and of the balls during disengagement.

The gearshift sleeve 16 is moved to the right for effecting disengagement. The mating surface 40 contacts thereby the mating flank 48, and the disk carrier 18 is also moved to the right. The disk carrier 18 is thereby first carried along by the gearshift-sleeve carrier 15 through the rolling members 30. However, as soon as the noses 85 in the grooves 86 have reached an edge 88 (FIG. 7) of the mouths 0f peripherally extending slots 89 which are connected to the grooves 86, the segments 81 yield under the pressure produced by the balls 30 against the force of the springs 83: the ground is so to speak taken away from the balls 30, they fall into the lowermost points of the milled recesses 27 (FIG. 14). Supported by the incline of the mating surfaces 40 and the mating flanks 48 and by the return springs 31, the disk carrier 18 returns into its original position, the pressure between the disks is thereby completely cancelled and the gaps 42 again receive the lugs 38.

It is important for the abovedescribed engagement operation that the noses 85 of the segments 81 cause a blocking effect in the grooves 86, namely, that during engagement and in the engaged state, the segments 81 cannot yield and the balls 30 thus can be supported on a rigid part. This blocking of the segments 81 is cancelled only during a disengagement operation. However, it is possible to make the noses 85 narrower than the grooves 86. Such a nose is identified by the reference numeral 99 in FIG. 9. The segments 81 are in this embodiment during engagement pressed back against the force of the springs 83 until the noses 99 rest on a wall of an axially extending groove 100. This results in a damping effect which causes a smoother or softer engagement. The blocking in the engaged state exists also in this embodiment.

Figure 8:
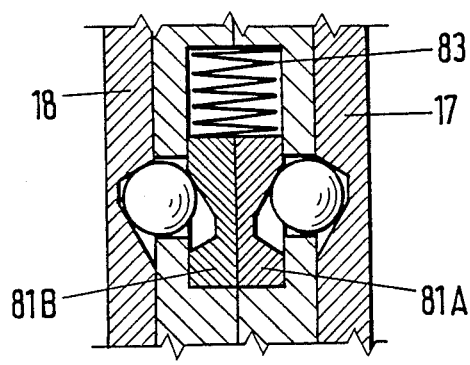
FIG. 8 illustrates a modification of the embodiment of FIG. 5.

Instead of arranging the milled recesses 27 for both clutches 8A, 8B in the same segment 81 as shown in FIG. 4, it is also possible to arrange two segments 81A, 81B side-by-side, of which the one 81A cooperates with the disk carrier 17 of the one clutch 8A and the other one 81B cooperates with the disk carrier 18 of the other clutch 8B (FIG. 8). The spring 83 can thereby, as is illustrated, act onto two segments 81A, 81B, or a separate spring can be provided for each segment 81A, 81B.

In a slightly different design of the chambers 80, the segments 81, 81A, 81B can each be connected with one another through webs 65 indicated in dashed lines in FIG. 3. The so created annular parts 66 do make the installation easier, however, they have a complicated shape because of the necessary free movement of the locking pins 56. All preceding and still following statements regarding the segments, in particular their milled recesses or sloped surfaces, their noses and springs, are valid accordingly also for the annular parts 66.

Figure 10:
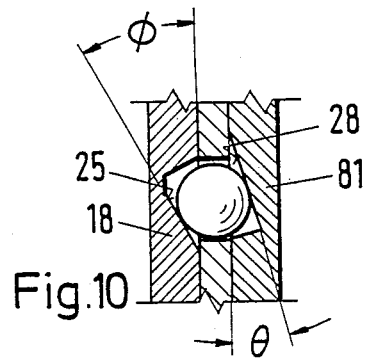
FIG. 10 illustrates a modification of the ramplike sloped surfaces.

The sloped surfaces 25 in the disk carriers 17,18 and the sloped surfaces 28 in the segments 81 do not need to extend parallel to one another as shown in FIG. 4. They can, as shown in FIG. 10, for optimizing the engaging and disengaging forces have different angles of inclination $\theta$, $\phi$, whereby the angle $\theta$ in the segment 81 is supposed to be chosen as small as possible and the angle $\phi$ in the disk carrier as large as possible.

Figure 9:
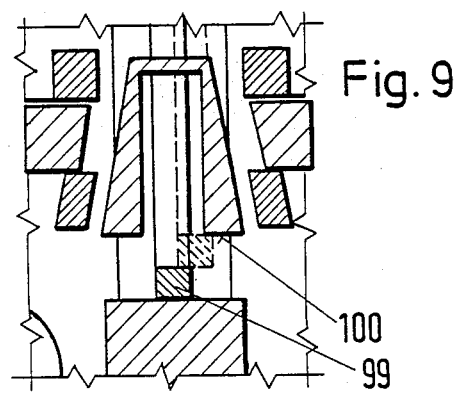
FIG. 9 illustrates a modification of the embodiment of FIG. 4.

The aforedescribed clutch modifications according to FIGS. 1 and 9 are related to those cases where always only the one direction of rotatation 54 exists. Small changes are needed in cases with two different directions of rotation.

Figure 11:
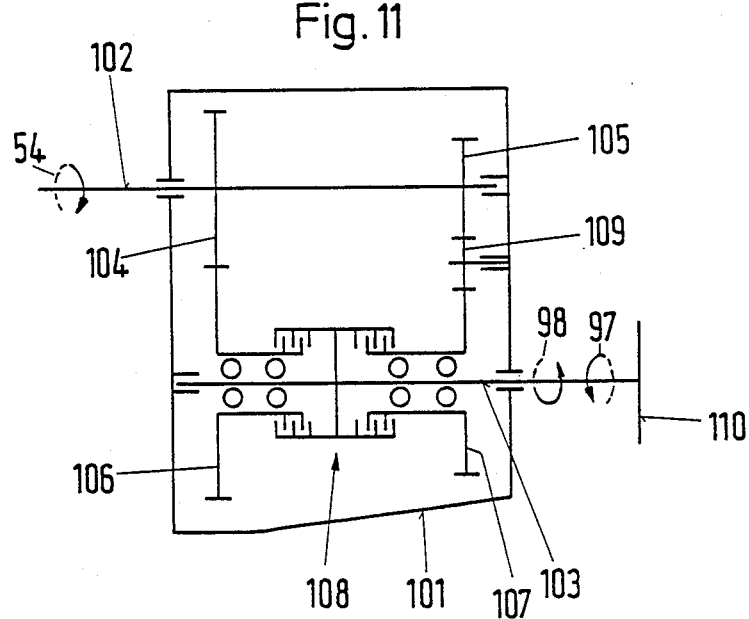
FIG. 11 is a schematic illustration of a transmission slightly differently built compared with FIG. 1.

FIG. 11 illustrates a much simplified suitable transmission, as it is used also in particular in boat reversing gears. A drive shaft 102 with two gears 104, 105 and a driven shaft 103 are supported in a housing 101. Two gears 106,107 are rotatably supported on the driven shaft 103, which gears can be selectively coupled by means of a friction clutch 108 with the driven shaft. The gear 106 engages the gear 104 and the gear 107 engages an intermediate gear 109 also supported in the housing, which intermediate gear 109 also engages the gear 105. The drive shaft is connected at its end projecting from the housing 101 to a motor (not illustrated), by which it is driven in direction of the arrow 54. A further shaft, for example a propeller shaft (not illustrated), can be connected to a flange 110 on the end of the driven shaft 103, which end projects from the housing 101.

Figure 12:
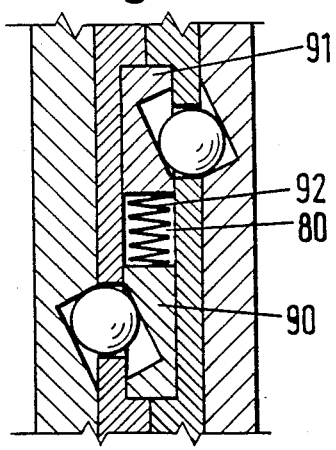
FIGS. 12 and 13 illustrate two possible embodiments of the support elements (segments) for the transmission according to FIG. 11.

The friction clutch 108 corresponds in principle with the friction clutch 8. However, because the gear 107 rotates, because of the intermediate gear 109, in the opposite direction of rotation compared with the gear 106, the segments must be constructed differently. One example for this is shown in FIG. 12. Two segments 90, 91 are arranged in the chamber 80, between which segments is inserted a pressure spring 92. The sloped surfaces 28 of the segments 90,91 extend in the same direction, also the sloped surfaces 25 in the disk carriers 17,18. The operation of the segments 90,91 is the same as the operation of the segments 81, a difference exists only—aside from the direction of the sloped surfaces—in the pressure springs 92 not being supported directly on the gearshift-sleeve carrier 15, but through the respective other segment.

Figure 13:
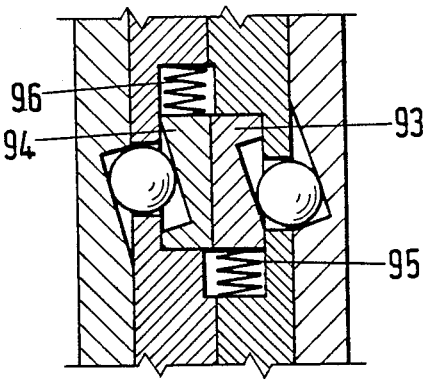

Another example is illustrated in FIG. 13. Similar to FIG. 8, two segments identified by the reference numerals 93,94 are here arranged side-by-side. A pressure spring 95,96 is associated with each segment. The pressure spring 95,96 are arranged oppositely acting because of the different directions of rotation 97,98. The operation of the segments 93,94 is again the same as the operation of the segments 81.

The embodiments of the invention in which an exclusive property or privilege is claimed are defined as follows:

1. In a shiftable friction clutch, having a pair of clutch halves, a gearshift sleeve which is axially movably supported on a shaft to be clutched and at least one axially movable friction ring which belongs to one clutch half and cooperates through clutch friction surfaces with the other clutch half and is supported on the shaft to be clutched through rolling members for producing a contact force proportional to torque by means of sloped surfaces inclined in a first direction with respect to a plane of rotation, said gearshift sleeve having means defining plural lugs and at least one groove, said friction ring having means defining plural teeth thereon, said teeth and lugs being adapted to operatively engage each other for purposes of effecting, in response to an axial movement of said gearshift sleeve, at least one of an engagement of said clutch halves and a disengagement of said clutch halves, the improvement comprising wherein:

(a) said teeth on said gearshift sleeve have means defining a first surface inclined in a second direction opposite to said first direction and relative to said plane of rotation;

(b) said means defining said plural lugs and at least one groove includes means defining a second surface generally parallel to said first surface, said first and second surfaces being brought into pressing engagement only when disengagement of said clutch halves is desired;

(c) said sloped surfaces are provided on a first axially facing side of at least one rotatable element on said shaft and which is rotatable relative to said shaft as well as on a second axially facing side on said friction ring which opposes said first axially facing side, the slope of said sloped surfaces being inclined the same direction at an acute angle relative to said plane of rotation;

(d) said at least one rotatable element is guided for said relative rotatable movement in a recess on said shaft and being spring loaded by means of a pressure spring acting in a direction of rotation of said shaft;

(e) said rolling members are guided between said sloped surfaces on said at least one element and on said friction ring, and in axial bores in a portion of said shaft which is oriented intermediate said opposing sloped surfaces; and (f) means are provided for causing said at least one rotatable element to be blocked so as to maintain said rolling members unmovable during engagement of said clutch and unblocked to facilitate movement of said rolling members during disengagement of said clutch, and while said friction ring is still in frictional engagement.

2. The friction clutch according to claim 1, wherein said at least one rotatable element is constructed as a segment having at least one sloped surface thereon.

3. The friction clutch according to claim 1, wherein said at least one rotatable element is an annular part having plural sloped surfaces thereon.

4. The friction clutch according to claim 1, which is constructed as a double friction clutch, wherein said at least one rotatable element has two sloped surfaces, of which one sloped surface is associated with the one clutch and the other sloped surface is associated with the other clutch.

5. The friction clutch according to claim 1, which is constructed as a double friction clutch, wherein in said recess there are arranged two rotatable elements rotatable independently from one another, of which one rotatable element is associated with the one clutch and the other rotatable element is associated with the other clutch.

6. The friction clutch according to claim 5, wherein in said recess there are arranged lying one behind the other in peripheral direction two rotatable elements and the spring force is produced by said pressure spring which is arranged between the two rotatable elements.

7. The friction clutch according to claim 5, wherein two rotatable elements are arranged lying side-by-side in said recess and a separate pressure spring is associated with each of said elements, which pressure springs load both elements in opposite rotational directions.

8. The friction clutch according to claim 1, wherein said sloped surface on said rotatable element has a lesser inclination with respect to the plane of rotation than said sloped surface on said friction ring.

9. The friction clutch according to claim 1, wherein a nose radially projects from said rotatable element for facilitating said rotatable element being blocked during an engagement of said clutch, said nose extending into said groove, the inside width of which corresponds with the width of said nose, and wherein said groove extends axially.

10. The friction clutch according to claim 1, wherein a nose, projecting from said at least one rotatable element is provided for facilitating said rotatable element being blocked during engagement of said clutch, said nose extending into said groove, the inside width of which is considerably greater than the width of said nose, and wherein said groove extends axially.

* * * * *